United States Patent
Takata et al.

(10) Patent No.: US 7,124,814 B2
(45) Date of Patent: Oct. 24, 2006

(54) MULTI-LAYERED ADHESIVE SHEET, MATERIAL FOR FORMING HEAT EXCHANGER, AND HEAT EXCHANGER

(75) Inventors: Tetsushi Takata, Kasukabe (JP); Satoshi Asai, Kasukabe (JP); Shoei Teshima, Handa (JP); Masumi Kuroyama, Nagoya (JP)

(73) Assignees: Somar Corporation, Chuo-Ku (JP); Denso Corporation, Kariya (JP)

( * ) Notice: Subject to any disclaimer, the term of this patent is extended or adjusted under 35 U.S.C. 154(b) by 70 days.

(21) Appl. No.: 10/872,825

(22) Filed: Jun. 21, 2004

(65) Prior Publication Data

US 2005/0006077 A1  Jan. 13, 2005

(30) Foreign Application Priority Data

Jun. 25, 2003  (JP) .............................. 2003-181762

(51) Int. Cl.
*F28F 3/00*  (2006.01)
(52) U.S. Cl. .................. 165/166; 29/890.039; 428/347
(58) Field of Classification Search ................ 165/133, 165/134.1, 166; 428/344, 349, 200, 201; 29/890.03, 890.039
See application file for complete search history.

(56) References Cited

U.S. PATENT DOCUMENTS

| | | | | |
|---|---|---|---|---|
| 3,590,917 A | * | 7/1971 | Huber et al. | 165/166 |
| 4,428,418 A | * | 1/1984 | Beasley et al. | 165/76 |
| 5,616,338 A | * | 4/1997 | Fox et al. | 424/423 |
| 5,677,053 A | * | 10/1997 | Moriga et al. | 428/347 |
| 6,403,232 B1 | | 6/2002 | Okamoto et al. | |
| 6,485,735 B1 | * | 11/2002 | Steen et al. | 424/423 |
| 2002/0139519 A1 | * | 10/2002 | Hosoya et al. | 165/133 |

FOREIGN PATENT DOCUMENTS

| | | | |
|---|---|---|---|
| GB | 1242397 | * | 8/1971 |
| JP | 58-119851 | * | 7/1983 |
| JP | 61-252284 | * | 11/1986 |
| JP | 62-30177 | * | 2/1987 |
| JP | 1-141099 | * | 6/1989 |
| JP | 2002-47523 | | 2/2002 |
| JP | 2002-243395 | | 8/2002 |

* cited by examiner

*Primary Examiner*—Teresa J. Walberg
(74) *Attorney, Agent, or Firm*—Burr & Brown

(57) ABSTRACT

A multi-layered adhesive sheet is provided, including a metal sheet and at least two thermosetting resin layers having different functions on at least one side of the metal sheet.

11 Claims, 2 Drawing Sheets

MOLTEN ADHESIVE

MULTI-LAYERED ADHESIVE SHEET, MATERIAL FOR FORMING HEAT EXCHANGER, AND HEAT EXCHANGER

BACKGROUND OF THE INVENTION

1. Field of the Invention

The present invention relates to a multi-layered adhesive sheet which is processed into parts having an optimum shape, assembled, and thermally cured to form a structure. More particularly, the present invention relates to a multi-layered adhesive sheet which exhibits sufficient bonding strength even if the thickness of the sheet is reduced in order to reduce the weight of the heat exchanger, and which can be bonded without lifting even when assembled into a curved shape, a material for forming a heat exchanger, and a heat exchanger.

2. Description of Background Art

In the case of manufacturing an aluminum heat exchanger, an aluminum sheet is processed into parts having a specific shape, and the resulting parts are assembled. As the aluminum sheet, an aluminum material with a thickness of about 500–1000 μm is used as a core material, and an aluminum material as a filler metal having a melting point lower than that of the aluminum material as the core material is stacked on one side or each side of the core material (see JP-A-2002-47523).

A filler metal made of aluminum generally has a melting temperature of about 577° C. and must be heated to a brazing temperature (about 600° C.) equal to or greater than the melting temperature during joining. This increases the amount of energy consumed during brazing. Therefore, an aluminum sheet coated with a resin instead of a filler metal made of aluminum has been proposed (JP-A-2002-243395).

In recent years, reduction of the weight of heat exchangers has been demanded for automotive air conditioner applications or the like. To deal with this demand, the thickness of the aluminum material used as the core material must be reduced to 100 μm or less. However, since the strength of the aluminum material is decreased by reducing the thickness of the aluminum material, it is necessary to use a high-strength aluminum alloy to which an element such as magnesium, copper, or silicon is added in order to increase the strength of the core material.

The strength of the alloy is increased by increasing the amount of element to be added. However, the brazability of the aluminum sheet on which a filler metal is stacked decreases to a large extent due to a decrease in the melting point or the like.

An aluminum sheet coated with a resin has been proposed in order to reduce energy consumption. However, this aluminum sheet exhibits insufficient bonding strength in a curved section or has inferior heat resistance. Therefore, an adhesive sheet material having sufficient reliability and replacing brazing has been demanded.

SUMMARY OF THE INVENTION

In view of the above-described problems occurring when reducing the weight of the heat exchanger, an object of the present invention is to provide an adhesive sheet which exhibits sufficiently reliable bonding strength (even if an aluminum material with a thickness of 100 μm or less is used as the core material), that maintains bonding strength, even in the case where the objective structure has a complicated shape and the adhesive sheet must be stacked in a curved shape, without lifting even in the curved section by allowing the adhesive to flow and fill the narrow gap between the curved sheets, and which excels in heat resistance, a material for forming a heat exchanger, and a heat exchanger.

The present inventors have conducted extensive studies to achieve the above object. As a result, the present inventors have found that an adhesive sheet which exhibits sufficient bonding strength even if the thickness of the sheet is reduced and can be bonded without lifting, even when assembled in a curved shape, can be obtained by providing at least two thermosetting resin layers having different functions on at least one side of a metal sheet. This finding has led to the completion of the present invention.

Specifically, the present invention provides an adhesive sheet, a heat exchanger material, a method of manufacturing a heat exchanger using the heat exchanger material, and a heat exchanger thus manufactured as discussed below.

According to one embodiment of the present invention, a multi-layered adhesive sheet is provided, comprising a metal sheet and at least two thermosetting resin layers having different functions on at least one side of the metal sheet.

According to one aspect of the first embodiment, the multi-layered adhesive sheet comprises at least two thermosetting resin layers comprising a first layer (A) formed of a thermosetting resin having a shear adhesion strength of 10–100 Mpa, and a second layer (B) formed on the first layer (A) of a thermosetting resin and having gap filling properties of 5–60 mm.

According to another aspect, the first layer (A) of the adhesive sheet has a glass transition temperature Tg of 120–300° C. According to yet another aspect, the first layer (A) has a modulus of elasticity at 80° C. of $1\times10^8$ to $1\times10^{10}$ Pa.

According to still another aspect, the second layer (B) has a melt viscosity at 150° C. of 0.5–0.01 Pa·s, and is tack-free at room temperature.

According to another aspect, the multi-layered adhesive sheet further comprises at least one of a thermally conductive layer and an adhesion improving layer, and yet another aspect provides that the metal sheet is formed of an aluminum material.

Another aspect of the first embodiment of the present invention provides that the thermosetting resin is an epoxy-based thermosetting resin.

According to a second embodiment of the present invention, a material for forming a heat exchanger is provided. The material comprises a multi-layered adhesive sheet according to any of the above-described aspects of the first embodiment of the present invention.

According to a third embodiment of the present invention, a method for manufacturing a heat exchanger is provided. The method includes a step of bonding the material for forming a heat exchanger according to the second embodiment described above.

According to a fourth embodiment of the present invention, a heat exchanger formed by bonding the material for forming a heat exchanger according to the second embodiment is provided.

DETAILED DESCRIPTION OF THE INVENTION

Figure 1:
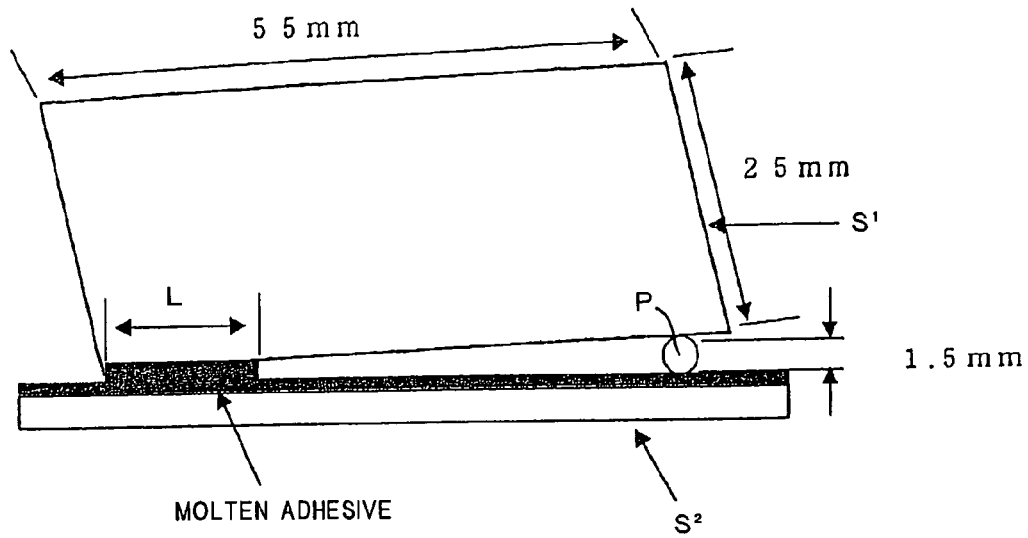
FIG. 1 is an explanatory diagram showing a method for measuring the gap filling properties of an adhesive sheet according to the present invention.

An adhesive sheet according to the present invention includes a metal sheet as a core material, and at least two thermosetting resin layers having different functions formed at least on one of the two surfaces of the metal sheet. As a material for the metal sheet, various conventional metals (including alloys) may be used. As examples include sheets made of an aluminum alloy, a copper alloy, an iron alloy, a magnesium alloy, and the like. The metal sheet may be formed of one layer, or may have a multi-layered structure consisting of two or more layers.

In the case of using the adhesive sheet according to the present invention as a material for forming a heat exchanger, a metal sheet having high thermal conductivity is used. Moreover, the metal sheet must be lightweight and have excellent corrosion resistance. An aluminum material is suitable from these viewpoints.

The aluminum material used herein refers to an aluminum alloy material in which an element such as magnesium, copper, silicon, manganese, iron, chromium, zirconium, or titanium is added to an aluminum metal in an amount of 0.1–10 atom %. Specific examples of such aluminum materials include those of JIS A2017 (Al—Cu), JIS A3003 (Al—Mn), JIS A5052 (Al—Mg), and the like can be given.

There are no specific limitations to the thickness of the metal sheet. The thickness of the metal sheet is usually 50–1000 µm, preferably 70–200 µm, and particularly preferably 70–100 µm. The metal sheet may optionally be subjected to various types of surface treatment. One example of a surface treatment includes methods for increasing adhesion between the surface of aluminum and the resin layer, such as a chromic phosphate treatment or a chromic chromate treatment. The metal sheet may optionally be annealed.

The curing temperature of the resins which make up the at least two thermosetting resin layers is from room temperature to 300° C. If the curing temperature is lower than room temperature, since storage stability of the adhesive sheet is decreased, the adhesive sheet must be stored at a temperature equal to or lower than room temperature, and the adhesive sheet must be processed into parts and assembled at a temperature equal to or lower than room temperature, whereby handling properties are decreased. If the curing temperature is higher than 300° C., it is necessary to increase the temperature to higher than 300° C. for thermally curing the resin, whereby joining workability is decreased. In particular, since the aluminum material which can be used as the core material is limited from the viewpoint of heat resistance, a reduction of the thickness of the metal sheet necessary to reduce the weight of the heat exchanger becomes difficult. Moreover, decomposition of the resin or the like may occur. The expression "room temperature" in the present specification means 22° C.

Examples of suitable thermosetting resins having a curing temperature from room temperature to 300° C. include a polyester resin, phenol resin, resorcinol resin, xylene resin, amino resin, polyurethane, unsaturated polyester resin, epoxy resin, and the like.

A resin layer preferably used in the present invention is a resin layer having a shear adhesion strength of 10–100 MPa at room temperature and a high temperature (120° C.) (hereinafter may be called "layer A"). If the shear adhesion strength is less than 10 MPa, strength of the structure formed by processing, assembling, and thermally curing the adhesive sheet is decreased.

The glass transition temperature Tg of the thermosetting resin used as the first layer A after curing is preferably 120–300° C. If the glass transition temperature is less than 120° C., the resulting automotive air conditioner cannot withstand use in summer in which outside air temperature is high, or in southern countries in which the average temperature is high, due to poor heat resistance. If the glass transition temperature is more than 300° C., heat resistance is sufficient. However, the resin loses toughness and becomes fragile, whereby shear strength is decreased.

The modulus of elasticity at 80° C. of the thermosetting resin used as the first layer A of the present invention after curing is preferably $1 \times 10^8$ to $1 \times 10^{10}$ Pa. If the modulus of elasticity is less than $1 \times 10^8$ Pa, the adhesive layer tends to cohere and break due to softness of the resin. If the modulus of elasticity is more than $1 \times 10^{10}$ Pa, the adhesive layer becomes fragile due to the absence of toughness.

In the present invention, it is preferable to use an epoxy resin as the thermosetting resin for the first layer A. Examples of suitable epoxy resins include a bisphenol A epoxy resin, bisphenol F epoxy resin, bisphenol S epoxy resin, phenol novolac epoxy resin, cresol novolac epoxy resin, triphenylmethane epoxy resin, alicyclic epoxy resin, special polyfunctional epoxy resin, and the like. These epoxy resins may be used individually or in combinations of two or more.

As an epoxy resin curing agent, a conventional curing agent may be used without specific limitations. Examples of suitable curing agents include amine-based curing agents such as a lower amine, aliphatic polyamine, aromatic polyamine, heterocyclic polyamine, polyamideamine, dicyandiamide and its derivatives, and imidazole compound, carboxylic anhydride curing agents, Lewis acid complex compounds, and the like.

The curing agent is used in an amount of 2–30 parts by mass, and preferably 3–20 parts by mass for 100 parts by mass of the epoxy resin.

An epoxy resin curing promoter may be further added. As the epoxy resin curing promoter, various conventional curing promoters may be used insofar as they do not substantially react with the epoxy compound at room temperature. Examples of suitable curing promoters include triphenylphosphine, tin octoate, dicyandiamide, boron trichloride/tertiary amine complex salt, boron trifluoride/amine complex salt, micropowdered substance obtained by modifying a nitrogen-containing compound such as imidazole or a tertiary amine to form an inactive film on the surface, and the like.

There are no specific limitations to the amount of the epoxy resin curing promoter to be added. The curing promoter is generally added in an amount of 0.01–5 parts by mass, and preferably 0.02–3 parts by mass for 100 parts by mass of the epoxy resin.

A filler such as silica, alumina, aluminum hydroxide, calcium carbonate, titanium oxide, mica, or talc, pigment, dye, silane coupling agent, flexibilizer, or anti-foaming agent may be added to the epoxy resin as an auxiliary component in an appropriate amount.

In the present invention, a resin layer having gap filling properties of 5–60 mm (hereinafter may be called the second layer or "layer B") is formed on the first layer A.

The expression "gap filling properties" used herein means the capability of filling a gap having a contact point formed by using rectangular specimens shown in FIG. 1 indicated in length. If the length is less than 5 mm, when the adhesive sheet is processed into parts, assembled in layers, and thermally cured, a narrow gap in the curved section is not sufficiently filled with the resin, and lifting occurs or the bonding strength in the curved section becomes insufficient. If the length is more than 60 mm, the resin layer in the second layer B flows to a large extent and is lost when thermally curing the adhesive sheet. This makes a stable stacking operation difficult, whereby workability is significantly decreased.

The thermosetting resin used as the second layer B according to the present invention has a melt viscosity at 150° C. of 0.5–0.01 Pa·s, and is tack-free at room temperature. If the melt viscosity at 150° C. is more than 0.5 Pa·s, flowability becomes insufficient during heating, whereby a narrow gap in the curved section cannot be filled with the resin. If the melt viscosity is less than 0.01 Pa·s, the resin is lost. The thermosetting resin used as the second layer B must be tack-free at room temperature. This prevents the second layers B from adhering to each other or being mispositioned, since the second layers B come in contact with each other when the adhesive sheet of the present invention is wound during production, or stored for a long time in a wound state, or processed into parts and assembled.

As the thermosetting resin used as the second layer B, it is preferable to use an epoxy resin in the same manner as the first layer A.

Figure 2:
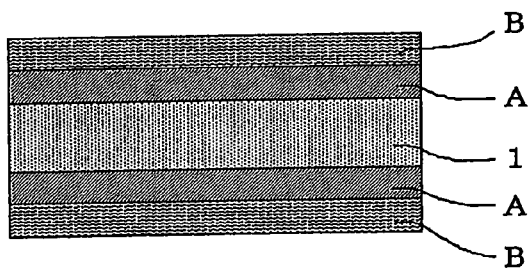
FIG. 2 is an explanatory diagram showing an adhesive sheet according to the present invention.

As shown in FIG. 2, the adhesive sheet according to the present invention preferably has a configuration in which the thermosetting resins having different functions are provided as the first layer A and the second layer B on at least one side of the metal sheet 1 as the core material.

In the case of forming a heat exchanger by processing, assembling, and thermally curing the adhesive sheet, in order to secure sufficient bonding strength even in the curved section of the stacked structure, it is important to cause the gap in the curved section to be sufficiently filled with a thermosetting resin having a high shear adhesion strength. However, in the case of using an adhesive sheet having a configuration in which only one thermosetting resin layer is provided on the metal sheet as the core material, the gap filling properties are decreased if the shear adhesion strength is increased, and the shear adhesion strength is decreased if the gap filling properties are increased. Specifically, the shear adhesion strength and the gap filling properties conflict with each other.

Figure 4:
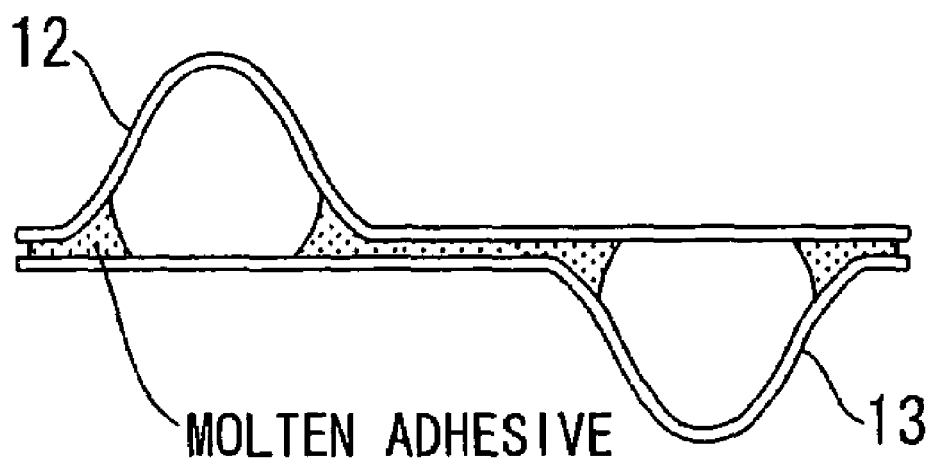
FIG. 4 is an enlarged sectional view of an adhesive sheet according to the present invention, wherein the state of gaps filled with the resin used for adhesive is illustratively shown.

In the present invention, the shear adhesion strength and gap filling properties are both satisfied by stacking the thermosetting resin layers which otherwise have conflicting shear adhesion strength and gap filling properties as the first layer A and the second layer B, whereby the gap in the curved section can be sufficiently filled with the thermosetting resin having a high shear adhesion strength. This is because the thermosetting resin having a high shear adhesion strength penetrates into all the gaps and fills them thoroughly as shown in FIG. 4 without fail, thereby the concentration of stress on certain portion can be prevented.

This is because the second layer B, as the outer layer, melts and flows to fill the gap during heating, and the first layer A having a high shear adhesion strength then adheres.

The thicknesses of the first layer A and the second layer B are arbitrarily determined. The total thickness of the first layer A and the second layer B is 10–70 μm, and preferably 15–50 μm from the viewpoint of reducing the weight of the heat exchanger and reducing the thickness of the adhesive sheet. The ratio of the thickness of the first layer A to the thickness of the second layer B may be changed in this range taking the balance between the required shear adhesion strength and gap filling properties into consideration. Specifically, in the case where the degree of curvature is small and the shear adhesion strength is important, the thickness of the first layer A may be increased. In the case where the degree of curvature is great and the gap has a complicated shape, the thickness of the second layer B may be increased in order to secure gap filling properties. Generally, the ratio of the thickness of the second layer B to the thickness of the first layer A, i.e., the (B/A) ratio, is preferably 0.5–7.

An example of a method of manufacturing the adhesive sheet according to the present invention and having the configuration shown in FIG. 2 is described below. The adhesive sheet shown in FIG. 2 has a configuration in which the first layer A and the second layer B are stacked on each side of the metal sheet. However, adhesive sheets having other configurations may be manufactured by using the same method.

A coating liquid A consisting of a thermosetting resin having the composition for the first layer A and a coating liquid B consisting of a thermosetting resin having the composition for the second layer B are prepared according to the procedure described below. The coating liquid A is applied to one side of the metal sheet to a desired thickness using a roll coater, comma coater, bar coater, or the like. The applied liquid is heated at 80–120° C. for 1–5 minutes using a dryer to dry and remove the solvent in the thermosetting resin composition to form a first layer A. The first layer A is also formed on the other side of the metal sheet by using the same method to form a double-sided coated product. The coating liquid B is applied to each of the first layers A using the same method as the first layer A and is then dried to form an adhesive sheet having a double-sided configuration in which the first and second thermosetting resin layers A and B are formed on each side of the metal sheet.

<Preparation of Coating Liquid>

(1) A filler consisting of an inorganic filler, a flexibilizer consisting of an elastomer, and a silane coupling agent are added to a liquid resin which is prepared in advance by diluting an epoxy resin with a solvent at a desired viscosity.

(2) A curing agent and a curing promoter are added to the liquid obtained in step (1), and the mixture is further mixed.

The adhesive sheet according to the present invention is used by forming the adhesive sheet into parts having predetermined dimensions and shapes by press forming or the like, stacking and assembling the resulting parts, and bonding the assembled parts by heating the parts at the melting temperature of the first layer A and the second layer B. In the case where the shape of the parts is complicated, the adhesive sheet of the present invention must be stacked in a curved shape. However, even if the structure has a number of narrow gaps, the adhesive flows to fill the gaps therewith, whereby the parts can be bonded without lifting even in the curved section.

Figure 3:
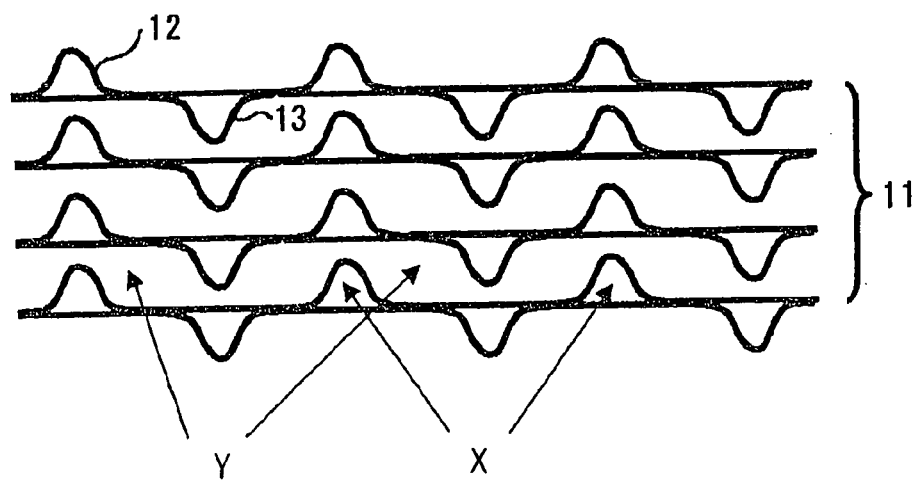
FIG. 3 is a schematic diagram showing an example of a heat exchanger formed using an adhesive sheet according to the present invention.

The adhesive sheet according to the present invention is advantageously used as a material for forming a heat exchanger. FIG. 3 shows a schematic diagram of a part of the cross section of an example of a heat exchanger formed using the adhesive sheet according to the present invention.

In FIG. 3, 11 denotes a heat exchanger, and 12 and 13 denote the multi-layered adhesive sheets according to the present invention. A peak-shaped narrow space X is a section in which liquid such as refrigerant oil, water, or LLC flows, and a wider space Y is a section in which air flows.

In order to exchange heat between two types of fluid (liquid and gas) using the heat exchanger, the liquid and air are caused to interchange with each other through the adhesive sheet according to the present invention shown in FIG. 3.

EXAMPLES

The present invention is described below in more detail by examples. However, the present invention is not limited to the following examples. The properties of the adhesive sheet were evaluated according to the following methods.

(Modulus of Elasticity (Pa))

The coating liquid A for the first layer A was applied to a silicon release film using a bar coater so that the thickness after drying was 30 μm. The release film was placed in a hot-blast drier, and the applied liquid was dried at 100° C. for three minutes. The release film was placed in another hot-blast drier, and the dried liquid was cured by heating at 200° C. for 30 minutes. The resulting sheet was removed from the release film and processed to a dimension of 3 mm×15 mm. The modulus of elasticity of the sheet was measured by a TMA tensile mode method using a TMA4000S (manufactured by MAC SCIENCE) under the following conditions.

<Conditions>

Temperature rise rate: 10° C./min; and Load: −5 to −10 g.

The load of −5 to −10 g is not the compressive load, but the tensile load.

(Glass Transition Temperature (Tg))

The temperature at which tanδ was maximum when measuring the modulus of elasticity using the above method was employed as the Tg.

(Shear Adhesion Strength)

The coating liquid A for the first layer A was applied to one side of an aluminum sheet using a bar coater so that the thickness after drying was a predetermined value. The aluminum sheet was placed in a hot-blast drier, and the applied liquid was dried at 100° C. for three minutes. The coating liquid B for the second layer B was applied to the first layer A so that the thickness after drying was a predetermined value and dried in the same manner as the first layer A to form a stacked adhesive specimen for measuring shear adhesion strength.

The resulting stacked adhesive specimen was processed into a shape and size of a specimen according to JIS K6850. The stacked adhesive sheets were layered so that the surfaces of the layers B faced each other, and cured by heating at 200° C. for 30 minutes in a hot-blast drier while being fastened using a pinch cock.

A specimen for measuring the shear adhesion strength was prepared in this manner. The shear adhesion strength of the specimen was measured at a tensile rate of 5 mm/min according to JIS K6850.

(Melt Viscosity at 150° C.)

The viscosity at 150° C. was measured using an ICI cone and plate viscometer (manufactured by K.K. CODIX).

(Gap Filling Properties)

As shown in FIG. 1, a stacked adhesive sheet specimen $S^1$ (thickness: 1.0 mm, width: 25 mm, length: 55 mm) formed using the same method as the specimen for measuring the shear adhesion strength was perpendicularly placed on a stacked adhesive sheet specimen $S^2$ (thickness: 1.0 mm, width: 25 mm, length: 60 mm) which was horizontally placed. The stacked adhesive sheet specimens $S^1$ and $S^2$ were assembled so that the stacked adhesive sheet specimen $S^1$ was in contact with the stacked adhesive sheet specimen $S^2$ on one end and a spacer rod P (diameter: 1.5 mm) was provided on the other end. The stacked adhesive sheet specimens $S^1$ and $S^2$ were caused to adhere by heating at a curing temperature of 200° C. for 30 minutes. As shown in FIG. 1, the gap filling length L of the adhesive at which the gap between the stacked adhesive sheet specimens $S^1$ and $S^2$ was filled with the molten adhesive was taken to represent the gap filling properties.

Example 1

50.0 parts by mass of a bisphenol A epoxy resin ("Epikote 828" manufactured by Japan Epoxy Resins Co., Ltd.) was dissolved with stirring in 71.4 parts by mass of a phenol-dicyclopentadiene epoxy resin ("XD-1000-2L" manufactured by Nippon Kayaku Co., Ltd.) (solid content: 70%, toluene solution) to prepare an epoxy resin solution. After the addition of 125.0 parts by mass of an aromatic polyamide-polybutadiene-acrylonitrile copolymer containing a phenolic hydroxyl group ("BP01-40D" manufactured by Nippon Kayaku Co., Ltd.) (solid content: 40%, DMF solution) as a flexibilizer, 100.0 parts by mass of titanium oxide ("Tipaque R-580" manufactured by Ishihara Sangyo Kaisha, Ltd.) as a filler, and 1.0 part by mass of a silane coupling agent ("Sila-Ace S-510" manufactured by Chisso Corp.) to the epoxy resin solution, the mixture was blended by using a homogenizer. Then, 5.9 parts by mass of a curing agent ("Epicure DICY15" manufactured by Japan Epoxy Resins Co., Ltd.) and 0.5 part by mass of triphenyl phosphine as a curing promoter were added to the mixture to prepare a coating liquid A consisting of a thermosetting resin composition for a first layer A.

The resulting coating liquid was applied to one side of an aluminum sheet with a thickness of 100 μm and dried (100° C. for three minutes) to form a first layer A with a thickness of 15 μm. The first layer A with a thickness of 15 μm was also formed on the other side of the aluminum sheet using the same method.

5.2 parts by mass of a curing agent ("Epicure DICY15" manufactured by Japan Epoxy Resins Co., Ltd.) and 0.5 part by mass of triphenyl phosphine as a curing promoter were added to 142.9 parts by mass of a phenol-dicyclopentadiene epoxy resin ("XD-1000-2L" manufactured by Nippon Kayaku Co., Ltd.) (solid content: 70%, toluene solution). The mixture was blended by using a homogenizer to prepare a coating liquid B consisting of a thermosetting resin composition for a second layer B.

The resulting coating liquid B was applied to the first layer A formed as described above and dried (100° C. for three minutes) to form a second layer B with a thickness of 15 μm. The second layer B with a thickness of 15 μm was also formed on the other side by using the same method to form a multi-layered adhesive sheet according to the present invention including two thermosetting resin layers having different functions on each side. The properties of the multi-layered adhesive sheet are shown in Table 1.

Example 2

The coating liquid A prepared in Example 1 was applied to one side of an aluminum sheet with a thickness of 100 μm and dried (100° C. for three minutes) to form a first layer A with a thickness of 5 μm. The first layer A with a thickness of 5 μm was also formed on the other side of the aluminum sheet by using the same method.

The coating liquid B was applied to the first layer A formed as described above and dried (100° C. for three minutes) to form a second layer B with a thickness of 25 μm. A multi-layered adhesive sheet according to the present invention including two thermosetting resin layers having different functions on each side was formed in this manner. The properties of the multi-layered adhesive sheet are shown in Table 1.

Comparative Example 1

The coating liquid A prepared in Example 1 was applied to one side of an aluminum sheet with a thickness of 100 μm and dried (100° C. for three minutes) to form a first layer A with a thickness of 30 μm. The first layer A with a thickness of 30 μm was also formed on the other side of the aluminum sheet by using the same method to form an adhesive sheet including one thermosetting resin layer on each side. The properties of the adhesive sheet are shown in Table 1.

Comparative Example 2

The coating liquid B prepared in Example 1 was applied to one side of an aluminum sheet with a thickness of 100 μm and dried (100° C. for three minutes) to form a second layer B with a thickness of 30 μm. The second layer B with a thickness of 30 μm was also formed on the other side of the aluminum sheet by using the same method to form an adhesive sheet including one thermosetting resin layer on each side. The properties of the adhesive sheet are shown in Table 1.

TABLE 1

| Properties | | Example 1 | Example 2 | Comparative Example 1 | Comparative Example 2 |
|---|---|---|---|---|---|
| Thickness of layer A (μm) | | 15 | 5 | 30 | — |
| Thickness of layer B (μm) | | 15 | 25 | — | 30 |
| Tg (° C.) | | 138 | 138 | — | — |
| Modulus of elasticity (Pa, 80° C.) | | $1.2 \times 10^9$ | $1.2 \times 10^9$ | — | — |
| Shear strength (MPa) | Room temperature | 27.8 | 19.7 | 20.5 | 12.0 |
| | 120° C. | 20.8 | 19.7 | 20.5 | 9.8 |
| Gap filling properties (mm) | | 6 | 12 | 1 | 20 |

The adhesive sheet according to the present invention excels in bonding strength and can be securely bonded without lifting even if the shape of the parts is complicated and the stacked sheet must be stacked in a curved shape. Since the second layer B and the first layer A meet and flow and fill the narrow gap between the sheets in the curved section of the adhesive sheet, the adhesive sheet of the present invention is bonded with high accuracy and high strength. Even if the adherend has a complicated uneven surface, the adhesive sheet of the present invention is curved along the uneven surface with high accuracy. In this case, since the second layer B and the first layer A melt and flow and fill the narrow gap between the surface of the adherend and the adhesive sheet in the curved section of the adhesive sheet, the adhesive sheet of the present invention adheres to the surface of the adherend with high accuracy and high strength.

The adhesive sheet according to the present invention is suitable as a material for forming a heat exchanger. A lightweight and inexpensive heat exchanger can be easily formed by bonding the adhesive sheet of the present invention according to a conventional method.

What is claimed is:

1. A multi-layered adhesive sheet comprising:
    a metal sheet; and
    at least two thermosetting resin layers having different functions formed on at least one of two surfaces of the metal sheet;
    wherein the at least two thermosetting resin layers comprise a first thermosetting resin layer having a shear adhesion strength in a range of 10–100 MPa, and a second thermosetting resin layer formed on the first layer and having gap filling properties of 5–60 mm.

2. The multi-layered adhesive sheet according to claim 1, wherein the first layer has a glass transition temperature Tg in a range of 120–300° C.

3. The multi-layered adhesive sheet according to claim 1, wherein the first layer has a modulus of elasticity at 80° C. in a range of $1 \times 10^8$ to $1 \times 10^{10}$ Pa.

4. The multi-layered adhesive sheet according to claim 1, wherein the second layer has a melt viscosity at 150° C. in a range of 0.5–0.01 Pa·s, and is tack-free at room temperature.

5. The multi-layered adhesive sheet according to claim 1, further comprising at least one of a thermally conductive layer and an adhesion improving layer.

6. The multi-layered adhesive sheet according to claim 1, wherein the metal sheet is formed of an aluminum material.

7. The multi-layered adhesive sheet according to claim 1, wherein the thermosetting resin is an epoxy-based thermosetting resin.

8. A material for forming a heat exchanger, the material comprising a plurality of multi-layered adhesive sheets, each of which comprises a metal sheet and at least two thermosetting resin layers having different functions formed on at least one of two surfaces of the metal sheet, wherein the at least two thermosetting resin layers comprise a first thermosetting resin layer having a shear adhesion strength in a range of 10–100 MPa, and a second thermosetting resin layer formed on the first layer and having gap filling properties in a range of 5–60 mm.

9. The material for forming a heat exchanger according to claim 8, wherein the metal sheet is an aluminum material containing at least one metal selected from the group consisting of magnesium, copper, manganese, iron, chromium, zirconium, and titanium.

10. A method of manufacturing a heat exchanger, comprising the steps of:
    providing a plurality of sheet materials for forming a heat exchanger, each of the sheet materials comprising a plurality of multi-layered adhesive sheets, each of the adhesive sheets comprising a metal sheet and at least two thermosetting resin layers having different functions formed on at least one of two surfaces of the metal sheet, wherein the at least two thermosetting resin layers comprise a first thermosetting resin layer having a shear adhesion strength in a range of 10–100 MPa, and a second thermosetting resin layer formed on the first layer and having gap filling properties in a range of 5–60 mm; and bonding the plurality of sheet materials to each other.

11. A heat exchanger formed by bonding a plurality of sheet materials, each of the sheet materials comprising a plurality of multi-layered adhesive sheets, each of the adhesive sheets comprising a metal sheet and at least two thermosetting resin layers having different functions formed on at least one of two surfaces of the metal sheet, wherein the at least two thermosetting resin layers comprise a first thermosetting resin layer having a shear adhesion strength in a range of 10–100 MPa, and a second thermosetting resin layer formed on the first layer and having gap filling properties in a range of 5–60 mm.

* * * * *